(12) United States Patent
 Sharma

(10) Patent No.: US 11,448,941 B2
(45) Date of Patent: *Sep. 20, 2022

(54) CAMERA FOCUS AND STABILIZATION SYSTEM

(71) Applicant: Apple Inc., Cupertino, CA (US)

(72) Inventor: Shashank Sharma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,610

(22) Filed: Jun. 25, 2021

(65) Prior Publication Data

US 2021/0318593 A1    Oct. 14, 2021

Related U.S. Application Data

(63) Continuation of application No. 16/571,659, filed on Sep. 16, 2019, now Pat. No. 11,048,147.

(60) Provisional application No. 62/739,110, filed on Sep. 28, 2018.

(51) Int. Cl.
 *H04N 5/225* (2006.01)
 *G03B 13/36* (2021.01)
 *G03B 3/04* (2021.01)
 *H04N 5/232* (2006.01)

(52) U.S. Cl.
 CPC .............. *G03B 13/36* (2013.01); *G03B 3/04* (2013.01); *H04N 5/2253* (2013.01); *H04N 5/2254* (2013.01); *H04N 5/23267* (2013.01); *G03B 2205/003* (2013.01); *G03B 2205/0069* (2013.01)

(58) Field of Classification Search
 CPC .. G03B 13/36; G03B 3/04; G03B 2205/0069; G03B 2205/003; H04N 5/2253; H04N 5/2254; H04N 5/23267
 See application file for complete search history.

(56) References Cited

U.S. PATENT DOCUMENTS

| 7,773,119 | B2 | 8/2010 | Wada et al. |
| 8,040,426 | B2 | 10/2011 | Zhou |
| 11,048,147 | B2 | 6/2021 | Sharma |
| 2012/0249815 | A1 | 10/2012 | Bohn et al. |

(Continued)

FOREIGN PATENT DOCUMENTS

CN     108476283     8/2018

OTHER PUBLICATIONS

International Search Report and Written Opinion from PCT/US2019/053574, Dated Jan. 17, 2020, Apple Inc., Pates 1-10.

(Continued)

*Primary Examiner* — Antoinette T Spinks
(74) *Attorney, Agent, or Firm* — Robert C. Kowert; Kowert, Hood, Munyon, Rankin & Goetzel, P.C.

(57) ABSTRACT

Various embodiments include a camera with a voice coil motor (VCM) actuator assembly to provide autofocus (AF) and/or optical image stabilization (OIS) movement. The VCM actuator assembly is configured to move an image sensor of the camera in three dimensions (e.g. X, Y, and Z) to provide the AF and/or OIS movements. The VCM actuator assembly is asymmetrical and includes an at least partially open side that allows an optical assembly of the camera to pass through the open side of the VCM actuator. In some embodiments, the optical assembly is part of a folded optics arrangement of the camera that includes one or more prisms/and or lenses.

20 Claims, 11 Drawing Sheets

(56) References Cited

U.S. PATENT DOCUMENTS

| | | |
|---|---|---|
| 2012/0314307 A1 | 12/2012 | Ikushima et al. |
| 2013/0016427 A1 | 1/2013 | Sugawara |
| 2014/0071400 A1 | 3/2014 | Gao |
| 2014/0362284 A1 | 12/2014 | Shin et al. |
| 2016/0178925 A1 | 6/2016 | Park et al. |
| 2017/0324905 A1 | 11/2017 | Yu |
| 2018/0041668 A1 | 2/2018 | Cui |
| 2018/0046063 A1 | 2/2018 | Sharma |
| 2018/0224624 A1 | 8/2018 | Ichihashi |
| 2019/0212632 A1 | 7/2019 | Miller et al. |
| 2019/0235202 A1 | 8/2019 | Smyth et al. |

OTHER PUBLICATIONS

Office Action from Chinese Application No. 201980062243.9, dated Nov. 12, 2021, (English Translation and Chinese Version), pp. 1-16.

CAMERA FOCUS AND STABILIZATION SYSTEM

PRIORITY CLAIM

This application is a continuation of U.S. application Ser. No. 16/571,659, filed Sep. 16, 2019, which claims benefit of priority to U.S. Provisional Application Ser. No. 62/739,110, filed Sep. 28, 2018, and which are incorporated herein by reference in their entirety.

BACKGROUND

Technical Field

This disclosure relates generally to an actuator assembly configured to translate an image sensor of a camera in directions along three axes (e.g. X, Y, and Z directions).

Description of the Related Art

The advent of small, mobile multipurpose devices such as smartphones and tablet or pad devices has resulted in a need for high-resolution, small form factor cameras for integration into such devices. Some small form factor cameras may incorporate optical image stabilization (OIS) mechanisms that may sense and react to external excitation/disturbance forces by adjusting a location of one or more optical lenses in one or more directions in an attempt to compensate for unwanted motion of the lenses. Some small form factor cameras may incorporate an autofocus (AF) mechanism whereby an object focal distance can be adjusted to focus an object plane in front of the camera at an image plane to be captured by an image sensor of the camera. In some such autofocus mechanisms, the optical lens or lenses are moved as a single rigid body along the optical axis of the camera to refocus the camera.

SUMMARY OF EMBODIMENTS

In some embodiments, a camera includes an aperture configured to enable light to enter the camera and an image sensor configured to capture the light that has entered the camera and convert the light into image signals. The camera also includes a voice coil motor (VCM) actuator assembly configured to translate the image sensor along three axes (e.g. X, Y, and Z axes). In some embodiments, the VCM actuator assembly is open on at least one side to allow at least a portion of an optical assembly of the camera to pass through the open side of the VCM actuator assembly. The VCM actuator assembly includes a substrate carrier, carrier frame, spring plate, suspension elements, and one or more VCM actuators. The image sensor is mounted on a substrate supported by the substrate carrier. The carrier frame at least partially surrounds the substrate carrier and permits the substrate carrier to translate vertically in an autofocus (AF) direction (e.g. in the Z-direction) relative to the carrier frame. The spring plate mechanically couples the substrate carrier to the carrier frame, wherein the spring plate permits motion of the substrate carrier relative to the carrier frame in the autofocus (AF) direction (e.g. a Z-direction) and restricts motion of the substrate carrier relative to the carrier frame in a plurality of optical image stabilization (OIS) directions orthogonal to the autofocus (AF) direction (e.g. X and Y directions). The suspension elements are mechanically connected at a first end to a static member of the camera and are mechanically connected at a second end to the carrier frame, either directly or via respective flex tabs of the spring plate. The suspension elements permit motion of the carrier frame and the substrate carrier in the plurality of optical image stabilization (OIS) directions (e.g. X and Y directions) and restrict motion of the carrier frame in the autofocus (AF) direction (e.g. the Z-direction). The one or more voice coil motor actuators, formed between respective magnets mounted to the carrier frame and respective coils positioned within the VCM actuator assembly, are configured to move the image sensor in the autofocus (AF) direction (e.g. the Z-direction) and move the image sensor in the plurality of optical image stabilization (OIS) directions orthogonal to the autofocus direction (e.g. the X and Y directions).

In some embodiments, a voice coil motor actuator assembly includes a plurality of magnets, a plurality of coils, a substrate carrier configured to support an image sensor on a substrate coupled to the substrate carrier, a carrier frame at least partially surrounding the substrate carrier, and a flexure assembly. The flexure assembly includes a spring plate that mechanically couples the substrate carrier to the carrier frame, wherein the spring plate permits motion of the substrate carrier relative to the carrier frame in an autofocus (AF) direction (e.g. Z-direction), and wherein the spring plate restricts motion of the substrate carrier relative to the carrier frame in a plurality of optical image stabilization (OIS) directions orthogonal to the autofocus (AF) direction (e.g. X and Y directions). The flexure assembly also includes a set of suspension elements configured to mechanically connect the carrier frame to a static member, wherein the suspension elements permit motion of the carrier frame and the substrate carrier in the plurality of optical image stabilization (OIS) directions orthogonal to the autofocus (AF) direction (e.g. X and Y directions) and restrict motion of the carrier frame in the autofocus (AF) direction (e.g. the Z-direction).

In some embodiments, a mobile multifunction device includes one or more processors, a display, and a camera including an aperture, image sensor, and voice coil motor actuator assembly. The aperture is configured to enable light to enter the camera, and the image sensor is configured to capture the light that has entered the camera and convert the light into image signals. The voice coil motor actuator assembly includes a plurality of magnets, a plurality of coils, a substrate carrier, a carrier frame, a spring plate, and a set of suspension elements. The substrate carrier supports the image sensor on a substrate coupled to the substrate carrier. The carrier frame at least partially surrounds the substrate carrier and the spring plate mechanically couples the substrate carrier to the carrier frame, wherein the spring plate permits motion of the substrate carrier relative to the carrier frame in an autofocus (AF) direction (e.g. Z-direction), and wherein the spring plate restricts motion of the substrate carrier relative to the carrier frame in a plurality of optical image stabilization (OIS) directions orthogonal to the autofocus (AF) direction (e.g. X and Y directions). The set of suspension elements mechanically connect the carrier frame to a static member of the camera, either directly or via flex tabs of the spring plate, wherein the suspension elements permit motion of the carrier frame and the substrate carrier in the plurality of optical image stabilization (OIS) directions orthogonal to the autofocus (AF) direction and restrict motion of the carrier frame in the autofocus (AF) direction. The one or more processors of the multi-function device are configured to cause the voice coil motor (VCM) actuator assembly to move the image sensor in the autofocus (AF) direction (e.g. Z-direction) and cause the voice coil motor (VCM) actuator assembly to move the image sensor in the plurality of optical image stabilization (OIS) directions orthogonal to the autofocus direction (e.g. X and Y directions).

Figure 1:
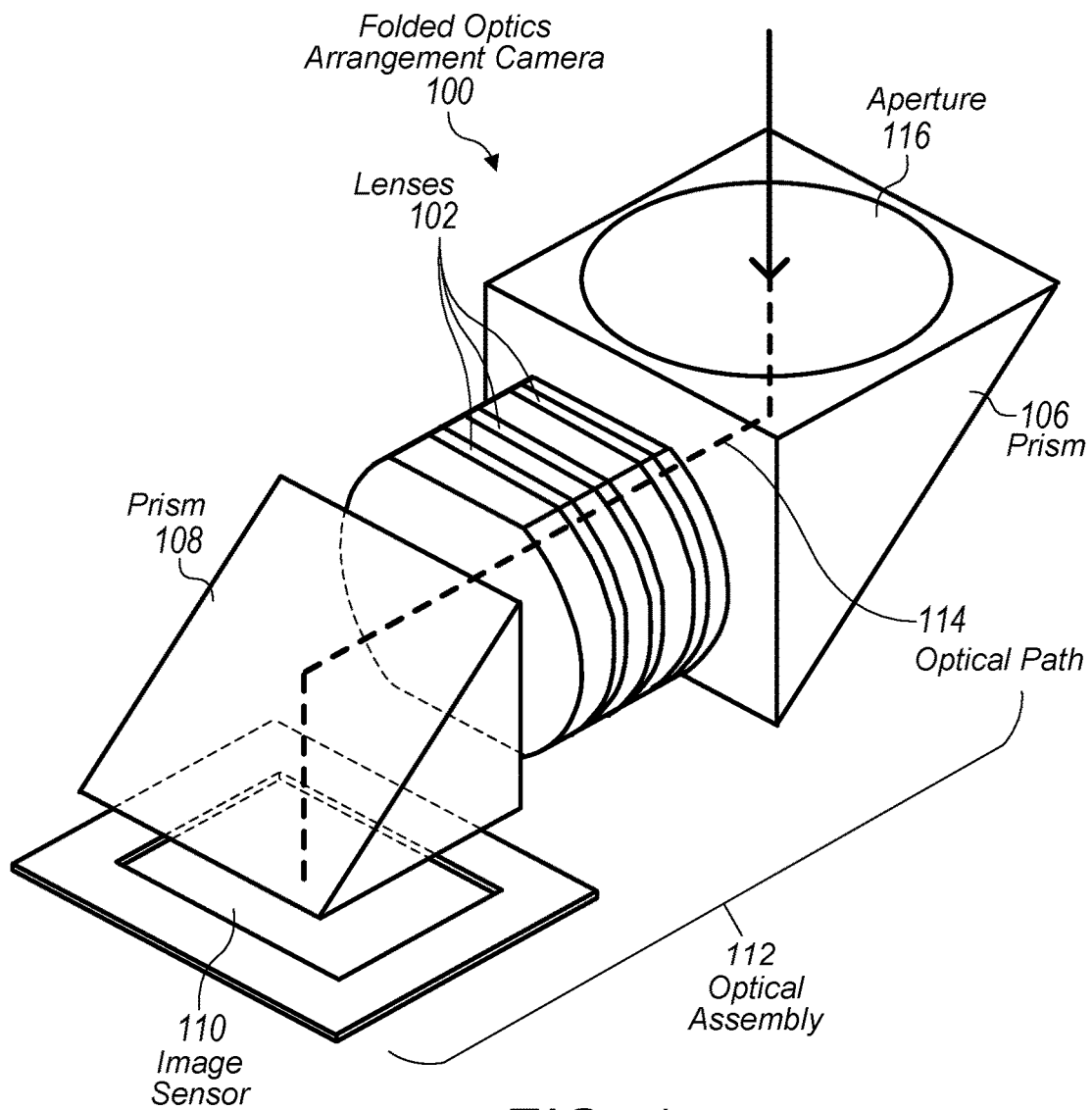
FIG. 1 illustrates a simplified view of a folded optics arrangement camera that is configured to translate an image sensor in an autofocus direction and multiple optical image stabilization directions, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, voice coil motors, and suspension elements that move an image sensor in three dimensions (e.g. X, Y, and Z). More specifically, in some embodiments, a voice coil motor actuator assembly includes a substrate carrier that couples with a substrate of an image sensor to suspend the image sensor in the camera below (or above) an optical element of the camera, such as a lens or prism. The substrate carrier is positioned within at outer carrier frame that is supported by suspension elements that suspend the carrier frame (and the substrate carrier mounted to the carrier frame along with the image sensor coupled to the substrate carrier) below (or above) an optical element of the camera, such as a lens or prism. Light directed at the image sensor via the optical element is directed from the optical element in a direction along an optical axis of the camera towards the image sensor.

The image sensor may move in an autofocus direction (e.g. vertically) closer towards the optical element or further away from the optical element to focus an object plane in front of the camera at an image plane to be captured by the image sensor of the camera. In order to move the image sensor in the autofocus direction, a voice coil motor (VCM) actuator of the VCM actuator assembly may generate Lorentz forces that cause the substrate carrier to translate vertically within the carrier frame either closer towards the optical element of the camera or further away from the optical element of the camera.

The image sensor may also move in a plurality of optical image stabilization (OIS) directions. For example, the image sensor may be moved in a plane perpendicular to the autofocus direction (e.g. in the X and Y directions). In order to move the image sensor in the OIS directions, an additional VCM actuator of the VCM actuator assembly may generate Lorentz forces that cause the carrier frame, substrate carrier, and image sensor to move together in a first OIS direction, such as the X-direction. Also, another VCM actuator may generate Lorentz forces that cause the carrier frame, substrate carrier, and image sensor to move together in a second OIS direction, such as the Y-direction. In this way the VCM actuator assembly may move the image sensor relative to the optical element of the camera in an autofocus direction and in a plurality of optical image stabilization directions.

In some embodiments, the carrier frame and the substrate carrier mounted within the carrier frame may include at least one open side. In some embodiments, an optical assembly of the camera may extend through the open side of the carrier frame and the substrate carrier to position an optical element above (or below) the image sensor. For example, in some embodiments, a prism may extend through an open portion of the carrier frame and/or substrate carrier and may be positioned above (or below) an image sensor coupled to the substrate carrier.

In some embodiments, an optical assembly for a camera may include a folded optics assembly, wherein light enters the camera via an aperture directed in a first direction. The light may be re-directed via a prism into a second direction, and may then be re-directed again into a third direction that is directed towards an image sensor of the camera. The image sensor may be suspended below (or above) the prism via a voice coil motor actuator assembly as described herein. The image sensor may be moved closer towards or further away from an optical element of the camera, such as the prism, to focus the camera. Also, the image sensor may be moved in a plane perpendicular to the autofocus direction to compensate for motion imparted to the camera via a user of the camera. For example a person taking a picture may move their hand causing the camera to move in a direction perpendicular to the autofocus direction.

In some embodiments, the voice coil motor actuator assembly may be asymmetrical, wherein magnets are mounted on three sides of a carrier frame of the voice coil motor actuator assembly, but magnets are not be mounted on an open fourth side of the carrier frame. This may allow the carrier frame and substrate carrier to move around an optical element of the camera such as a prism or lens that extends through an open side of the voice coil motor actuator assembly.

In some embodiments, an optical assembly of a folded optics arrangement camera that includes a voice coil motor actuator assembly, as described herein, may include power prisms that converge or diverge light in addition to reflecting the light. Also, an optical assembly of a folded optics camera that includes a voice coil motor actuator assembly, as described herein, may include one or more lenses that converge or diverge light, wherein the one or more lens are positioned between prisms of a folded optics arrangement camera. In some embodiments, the prisms, the one or more lenses, or a combination of prisms and/or lenses of an optical assembly of a folded optics arrangement camera may include free form optical surfaces that are non-concentric surfaces that converge or diverge light in a specific manner to provide optical zoom. In some embodiments, glass optics may similarly be used to provide optical zoom or a "zoomed" in view of a scene being captured by the camera. In some embodiments, an optical assembly of a folded optics arrangement camera that includes powered prisms and/or free form optics may require relative spacing and distances between the respective elements of the optical assembly (e.g. the prisms and lenses) to remain constant. Thus, instead of moving a lens to focus the camera as is commonly done in other camera applications, the image sensor may be moved towards or away from an optical element of the optical assembly that directs light that has been converged or diverged via the optical assembly towards the image sensor.

In some embodiments, an arrangement of coils, magnets, and hall sensors of a voice coil motor actuator assembly, as described herein, may include a dual-pole magnet interacting with perpendicularly oriented coils to generate Lorentz forces in perpendicular planes. For example a coil mounted to a side of a substrate carrier may be positioned along a first side of a dual pole magnet mounted on a carrier frame and may generate Lorentz forces that cause the substrate carrier to move within the carrier frame vertically towards or away from an optical element. Also, another coil may be positioned below the dual pole magnet coupled to the carrier frame, and the other coil may be coupled to a stationary component, such as a stationary flexure of the voice coil motor actuator assembly. The other coil interacting with the dual pole magnet may generate Lorentz forces that cause the carrier frame and substrate carrier coupled to the carrier frame to move in a horizontal direction, e.g. a Y-direction. Also, a single pole magnet mounted to the carrier frame and oriented perpendicular to the dual pole magnet may interact with another coil coupled to the stationary flexure to cause the carrier frame and substrate carrier coupled to the carrier frame to move in another horizontal direction, e.g. an X-direction.

In some embodiments, hall sensors may be positioned below the static flexure and may measure a magnetic field to determine a relative position of the carrier frame, and/or substrate carrier. Because the image sensor is fixed to the substrate carrier and because the substrate carrier and the carrier frame move together in the X and Y directions and because the image sensor and the substrate carrier move together in the Z direction, relative positions of the substrate carrier and carrier frame may be used to determine relative positions of the image sensor, relative to an optical element of the camera, such as a prism in the X, Y, and Z directions (also referred to herein as the OIS-X, OIS-Y, and AF-Z directions).

In some embodiments, an additional hall sensor may be coupled to a flexure of a substrate carrier and may measure a magnetic field of a single pole magnet mounted on the carrier frame to determine a relative vertical position of the substrate carrier relative to the carrier frame. Because the single pole magnet is mounted to the carrier frame and moves with the carrier frame, there is little or no cross coupling of directional measurements. For example, motion in the X or Y direction will not show up in measurements in the Z direction because both the magnet used for the sensor and the hall sensor itself move together as a unit in the X and Y directions. Thus, motion in the X or Y direction is not inadvertently attributed to the Z direction.

In some embodiments, the hall sensors included in a voice coil motor actuator assembly, as described herein, do not require additional magnets to measure magnetic fields used to determine relative positions of an image sensor, but instead utilize magnets that are part of the respective voice coil motor actuators or the voice coil motor actuator assembly.

FIG. 1 illustrates a simplified view of a folded optics arrangement camera and shows how light is bent within the folded optics arrangement camera, according to some embodiments.

In some embodiments, any of the embodiments described in regard to FIGS. 2-11 may include one or multiple features, components, and/or functionality as described herein with regard to folded optics arrangement camera 100 illustrated in FIG. 1. For example, any of the folded optics arrangement cameras described in regard to FIGS. 2-11 may bend light in a similar manner as described for folded optics arrangement camera 100. Also, any of the embodiments described in regard to FIGS. 2-11 may be included in a folded optics arrangement camera, such as folded optics arrangement camera 100. Additionally, any of the embodiments described in regard to FIGS. 2-11 may include an image sensor that is actuated in an autofocus (AF-Z) direction and optical image stabilization (OIS-X, OIS-Y) directions as described below for folded optics arrangement camera 100 illustrated in FIG. 1 and image sensor 104 illustrated in FIG. 2.

In some embodiments, folded optics arrangement camera 100 may include a group of one or more lenses 102 mounted in a lens carrier 104, a first prism 106, a second prism 108, and an image sensor 110. In some embodiments, the lens carrier 104 may be located between the first prism 106 and the second prism 108, forming an optical assembly 112. Light may enter folded optics arrangement camera 100 via an aperture 116 and follow an optical path 114 that is folded by the first prism 106 such that the light is directed towards the one or more lenses 102 of the lens carrier 104, passes through the one or more lenses 102, and is folded by the second prism 108 such that the light is directed towards the image sensor 110. As will be discussed in further detail below, the image sensor 110 may be coupled with an actuator assembly that is configured to move the image sensor 110 in multiple directions, e.g., to provide autofocus (AF) and/or optical image stabilization (OIS) functionality.

In some embodiments, prism 106 and/or prism 108 may be a power prism that both re-directs light and converges or diverges light. Also, in some embodiments, one or more optical surfaces of prism 106, 108, or lenses 102 may include a free-form optical surface that is not symmetrical (either translationally or rotationally) about axes normal to the mean plane. Such free-form optics may provide a greater amount of zoom than non-free-form optics. Also, in some embodiments, prism 106, 108, or lenses 102 may include glass optics that provide zoom. In some embodiments, such as embodiments that include power prisms, free-form optics, and/or glass optics, it may be necessary to maintain a relative position and distance between optical elements of an optical assembly, such as prism 106, 108, or lenses 102 of optical assembly 112 in order for the power prism, free-form optics and/or glass optics to function properly.

Figure 2:
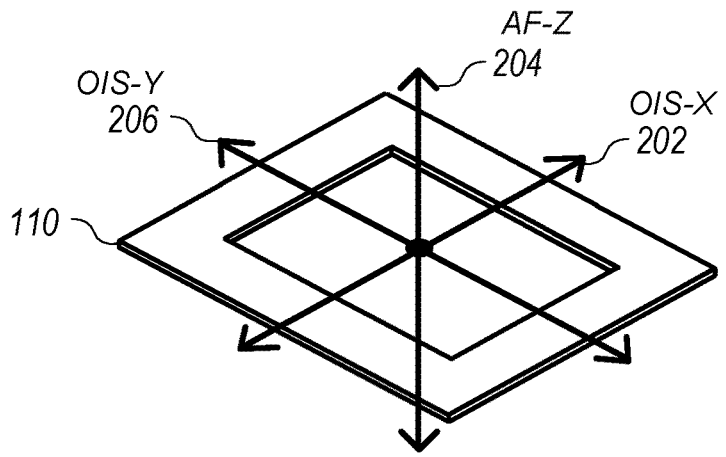
FIG. 2 illustrates movements of an image sensor of a folded optics arrangement camera in an autofocus direction and multiple optical image stabilization directions, according to some embodiments.

FIG. 2 illustrates voice coil motor actuator movements of the image sensor of the folded optics arrangement camera in an autofocus direction and multiple optical image stabilization directions, according to some embodiments.

FIG. 2 illustrates an example image sensor (e.g., image sensor 110) that moves in directions corresponding to at least three degrees of freedom, (e.g. along an X, Y, and Z axis) within a folded optics arrangement camera 100. In some embodiments, the image sensor 110 may be actuated by a voice coil motor actuator assembly as described herein with reference to FIGS. 1 and 3-11.

As indicated in FIG. 2, the image sensor 110 may be shifted (e.g., by an actuator, such as the actuator assemblies/arrangements discussed in further detail below) along an OIS-X axis 202 to provide optical image stabilization in the X-direction (also referred to herein as "OIS-X" movement). Additionally, or alternatively, the image sensor 110 may be shifted along a Z-axis 204 to provide autofocus (AF) movement in the Z-direction (also referred to herein as the autofocus or "AF movement"). Additionally, or alternatively, the image sensor 110 may be shifted along a Y-axis 206 to provide OIS movement in OIS-Y directions (also referred to herein as "OIS-Y movement"), which are orthogonal to the OIS-X directions.

Figure 3:
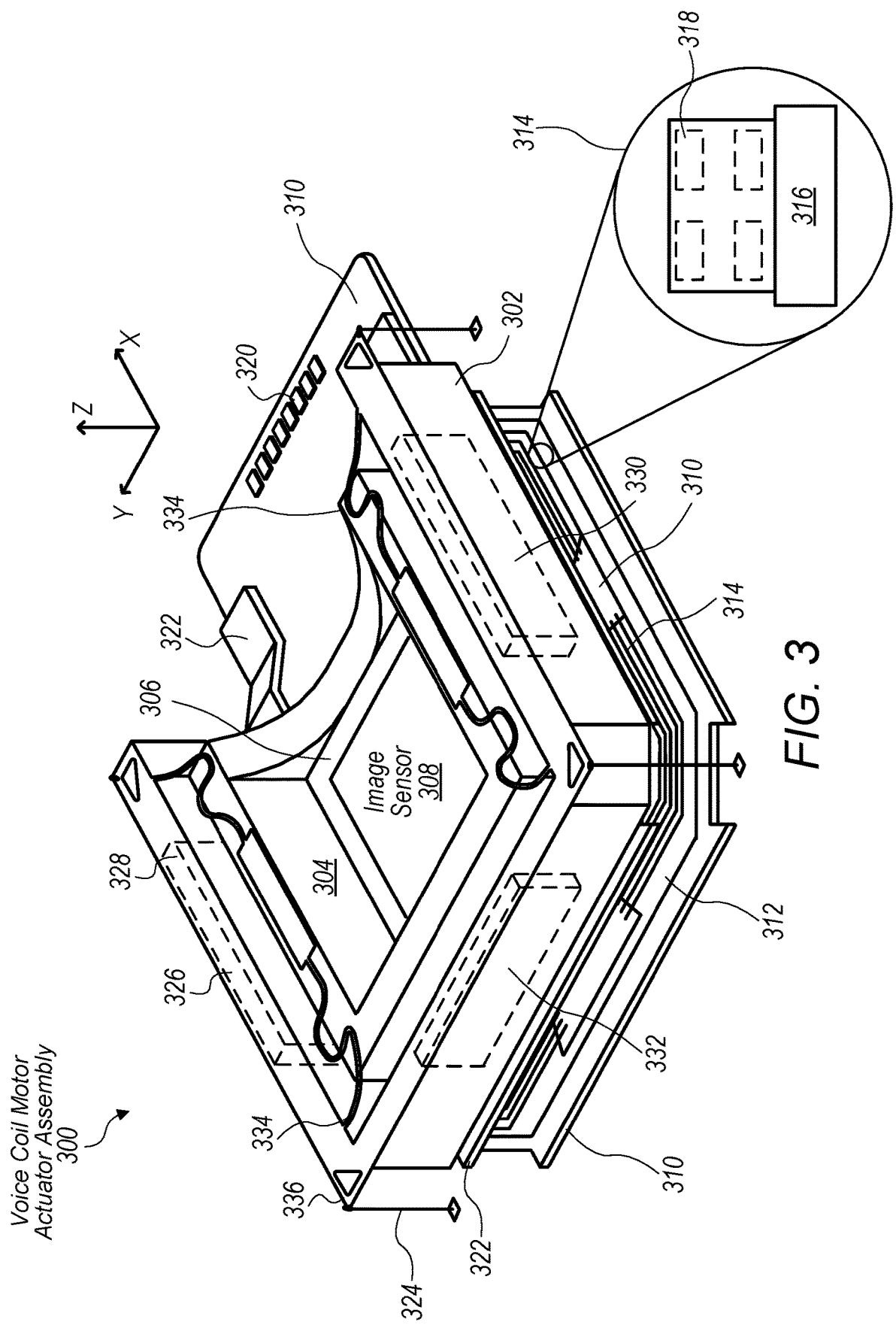
FIG. 3 illustrates a voice coil motor assembly (VCM) configured to translate an image sensor in an autofocus direction and multiple optical image stabilization directions, according to some embodiments.

FIG. 3 illustrates a voice coil motor assembly (VCM) configured to translate an image sensor in an autofocus direction and multiple optical image stabilization directions, according to some embodiments.

Voice coil motor actuator assembly 300 includes carrier frame 302 and substrate carrier 304. Substrate carrier 304 couples to substrate 306 of image sensor 308. Substrate carrier 304 suspends image sensor 308 below (or above) an optical element of a camera that includes voice coil motor actuator assembly 300, wherein image sensor 308 can be moved in the X, Y or Z direction via voice coil motor (VCM) actuator assembly 300.

In some embodiments, VCM actuator assembly 300 may mount in a camera such as a folded optics camera as described above in regard to FIGS. 1 and 2. In some embodiments, a static portion of a lower flexure of the VCM actuator assembly 300 may mount on a static component of a camera that includes the VCM actuator assembly 300. For example, static portion 310 of lower flexure 312 may mount on a base, can, wall, or other static component of a camera. The static portion 310 of lower flexure 312 may connect to a movable portion of the lower flexure 312 that is coupled to the image sensor via one or more flexure arms of the lower flexure. As an example, FIG. 3 illustrates static portion 310 of lower flexure 312 coupled to image sensor 308 (via a movable portion of lower flexure 312) by a plurality of flexure arms 314 that connect between the static portion 310 of the lower flexure 312 and the moveable center portion of the lower flexure. Note the moveable portion of lower flexure 312 may mount along the periphery or under image sensor 308, but is not visible in FIG. 3.

In some embodiments, flexure arms, such as flexure arms 314, may include a flexure arm spring 316 and one or more traces 318 running along the flexure arm spring 316. In some embodiments, traces, such as traces 318 may be mounted on a top side or bottom side of a flexure arm spring 316. In some embodiments, the traces 318 may be mounted in a single layer or multiple layers. In some embodiments, a flexure arm spring, such as flexure arm spring 316, may provide a ground path for electrical components connected to the lower flexure 312.

In some embodiments, a static portion of a lower flexure, such as static portion 310 of lower flexure 312, may include one or more communication connectors 320 configured to couple a camera module that includes VCM actuator assembly 300 and image sensor 308 to one or more other components of a device, such as multi-function device, in which the camera module is mounted. For example, the communication connectors 320 may provide image data captured by image sensor 308 to one or more processors of the device and may receive control signals or commands from the device for operations to be performed by the camera via VCM actuator assembly 300. For example, lower flexure 312 may include communication pathways between communication connectors 320 and image sensor 308 via flexure arms 314. Also, a static flexure, such as static flexure 322 may couple to the static portion 310 of the lower flexure 312 and may provide communication pathways between the communication connectors 320, one or more actuator controllers and/or drivers, and coils of VCM actuators that are embedded in or mounted on static flexure 322. Also, one or more hall sensors may be mounted on static flexure 322 and may provide magnetic field measurements (or displacement measurements) to other components of the VCM actuator assembly 300 (or other components of the camera) via communication pathways included in static flexure 322. For example, FIGS. 5, 6A, 6B, and 6C provide more detailed illustrations of coils and sensors mounted to a static flexure, such as static flexure 322.

In some embodiments, suspension elements of a VCM actuator assembly, such as suspension elements 324, may support a weight of a carrier frame of a VCM actuator assembly. For example, suspension elements 324 coupled to respective corners of carrier frame 302 may suspend carrier frame 302 above static portion 310 of lower flexure 312. Also, carrier frame 302 may be suspended above static flexure 322, wherein static flexure 322 is positioned underneath magnets 326 coupled to carrier frame 302 and above lower flexure 312. In some embodiments, the magnets 326 may include two dual pole magnets mounted on either side of the carrier frame 302 and a single pole magnet mounted on a side of the carrier frame orthogonal to the sides on which the dual pole magnets are mounted. In some embodiments, no magnets are mounted on a fourth side of the carrier frame that remains open, such that a portion of an optical assembly of a folded optics arrangement camera can pass through the open side of the carrier frame. In some embodiments, the optical assembly passing through the open side of the VCM actuator assembly is a static component and the substrate carrier 304 moves in a gap space between the substrate carrier 304 and the optical assembly. Note the optical assembly is not shown in FIG. 3 for clarity, but may be similar to an optical assembly as described in regard to optical assembly 112 in FIG. 1.

For example, in some embodiments, a dual pole magnet 328 is mounted on a first side of carrier frame 302 and a second dual pole magnet 330 is mounted on an opposite side of the carrier frame, parallel to the dual pole magnet 328. In some embodiments, an additional single pole magnet 332 is mounted on a third side of the carrier frame, wherein the third side is orthogonal to the first and second side, and wherein the single pole magnet 332 is mounted perpendicular to the two dual pole magnets 328 and 330.

In some embodiments, a spring plate may mechanically connect the substrate carrier to the carrier frame. For example, spring plate 334 mechanically connects carrier frame 302 to substrate carrier 304. In some embodiments, a spring plate, such as spring plate 334, may be a single spring plate that connects carrier frame 302 to substrate 304 in multiple locations, or in some embodiments, multiple individual springs, similar in function to spring plate 334 may mechanically connect substrate carrier 304 to carrier frame 302. In some embodiments, a spring plate, such as spring plate 334, may further include flex tabs, such as flex tabs 336. In some embodiments, suspension elements, such as suspension elements 324 may be mechanically connected to carrier frame 302 via flex tabs 336 of spring plate 334. In some embodiments, a separate flex tab may be used, or suspension elements 324 may directly couple with carrier frame 302.

In some embodiments, spring plate 334, may flex in the Z-direction to allow substrate carrier 304 to translate vertically relative to carrier frame 302, but may restrict motion of substrate carrier 304 relative to carrier frame 302 in directions orthogonal to the Z-direction (also referred to herein as the autofocus direction). For example, carrier frame 302 and substrate carrier 304 (along with image sensor 308) may translate in the X and Y directions (e.g. the OIS-X and OIS-Y) directions as a group, but substrate carrier 304 may be restricted by spring plate 334 from moving within carrier frame 30s in the X and/or Y directions.

In some embodiments, the suspension elements 324, may be semi-stiff suspension wires that restrict vertical motion in the Z-direction but permit lateral motion in the X and Y directions. For example, suspension elements 324 may allow the carrier frame 302, substrate carrier 304, and image sensor 308 (coupled to the substrate carrier 304) to translate in X and Y directions in response to Lorentz forces generated between magnets 326 and the respective coils mounted in static flexure 322 and one or more coils mounted to substrate carrier 304. However, the suspension elements 324 may restrict vertical or Z-motion of the carrier frame 302, wherein Z-motion of the image sensor 308 is achieved by the substrate carrier 304 translating vertically within carrier frame 302.

In some embodiments, an arrangement of suspension elements of an upper flexure along with a spring plate of the upper flexure that connects a carrier frame to a substrate carrier may allow for translation of the image sensor in X, Y, and Z directions, but may resist rotation of the image sensor about the X, Y, or Z axis. As noted above, the magnets 326 of voice coil motor actuator assembly 300 may move with the carrier frame and the respective coils associated with the magnets may be stationary, or may be coupled to the substrate carrier 304 (e.g. AF-Z coils).

In some embodiments, substrate carrier 304 may be made of a ceramic material to reduce a moving mass of the voice coil motor actuator assembly 300.

Figure 4:
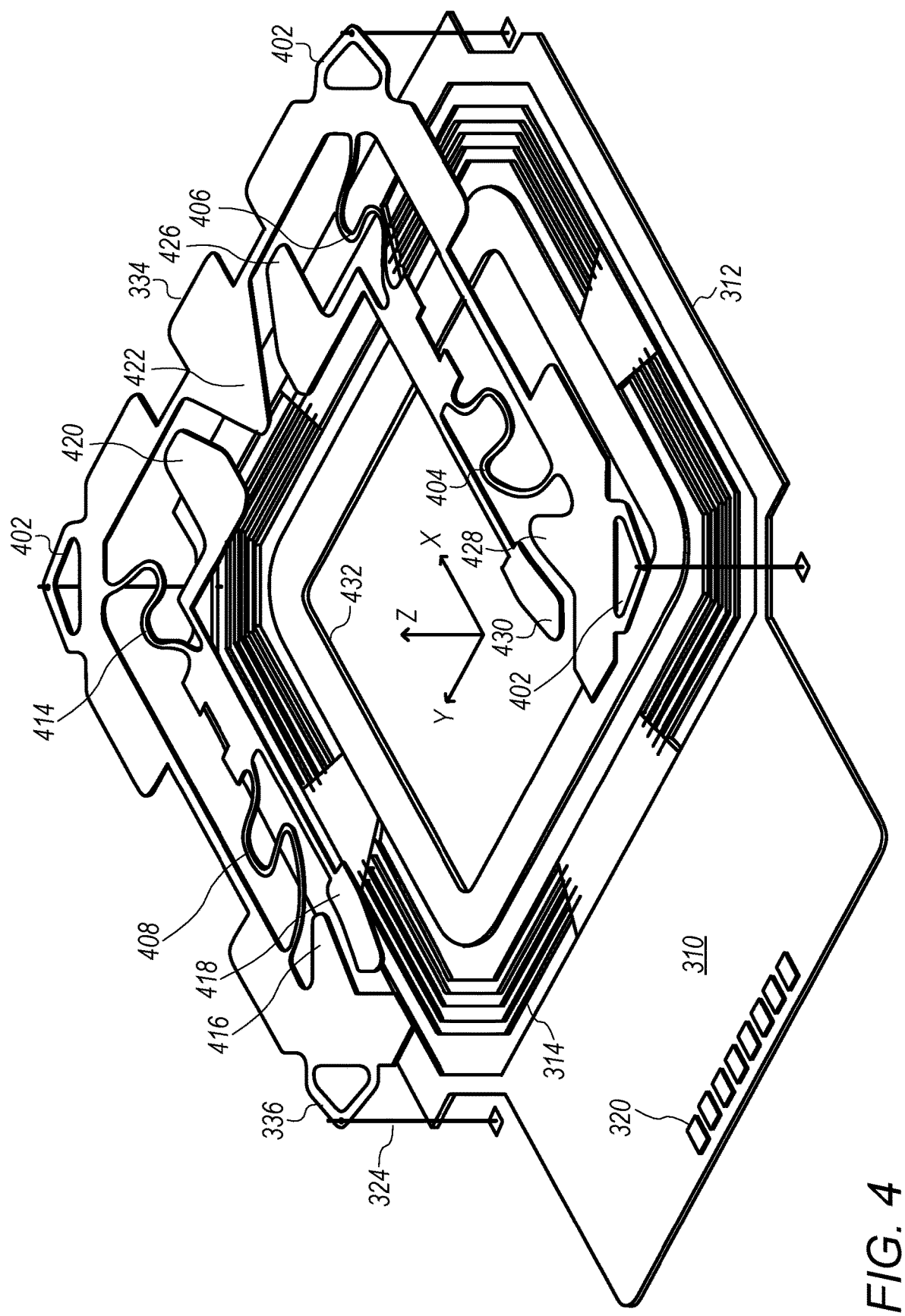
FIG. 4 illustrates a more detailed view of an upper flexure assembly comprising a spring plate and suspension elements and a more detailed view of a lower flexure assembly of a voice coil motor (VCM) actuator assembly, according to some embodiments.

FIG. 4 illustrates a more detailed view of an upper flexure assembly comprising a spring plate and suspension elements and a more detailed view of a lower flexure assembly of a voice coil motor (VCM) actuator assembly, according to some embodiments.

In some embodiments, spring plate 334 illustrated in FIG. 3 may be a spring plate such as spring plate 334 illustrated in FIG. 4. Also, suspension elements 324 may be suspension elements 324 as illustrated in FIG. 4. Additionally, lower flexure 312 may be a lower flexure 312 as illustrated in FIG. 4.

Spring plate 334 includes flex tabs 402, "S" springs 404, 406, 408, and 414, and acoustic bumper taps 416, 418, 420, 422, 426, 428, and 430. In some embodiments, the flex tabs may couple with suspension elements and flex to reduce stresses in the suspension elements, such as suspension elements 324, during high impact events, such as a device that includes a camera comprising a VCM actuator assembly 300 being dropped. In some embodiments, the acoustic bumper tabs may limit relative motion of a substrate carrier relative to a carrier frame at both an upper travel limit and a lower travel limit. For example, a tab or knob on a substrate carrier may impact the one or more acoustic bumper tabs to prevent the substrate carrier from travelling any further in a vertical direction relative to the carrier frame.

Lower flexure 31 includes an outer static portion 310 and an inner movable portion 432. The outer static portion 310 is connected to the inner movable portion 432 via flexure arms 314. In some embodiments lower flexure 312 may provide a communication pathway between an image sensor, such as image sensor 308 coupled to lower flexure 310 via movable portion 432 and flex arms 314 and one or more static components coupled to connectors 320 of lower flexure 312.

Figure 5:
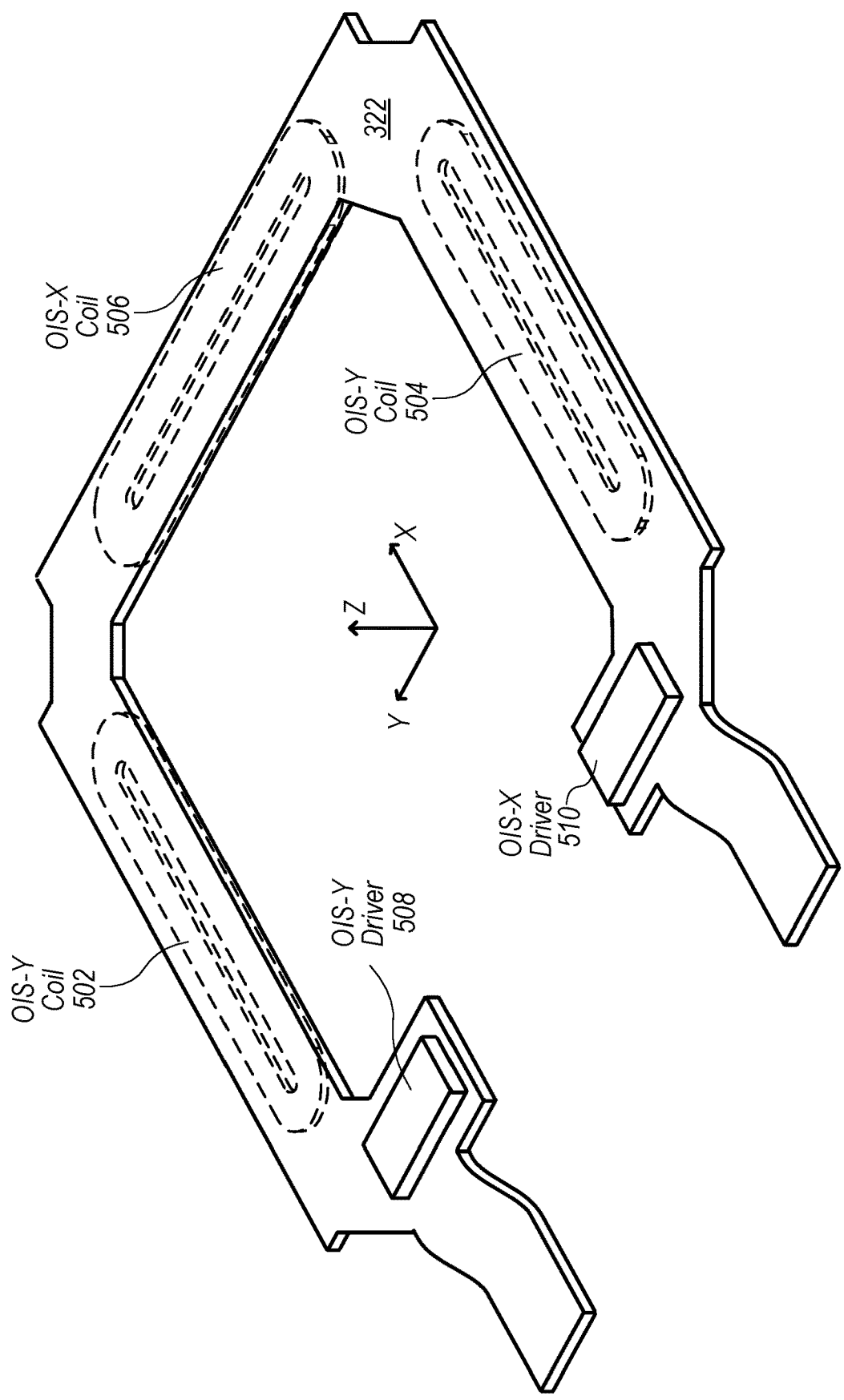
FIG. 5 illustrates a voice coil motor actuator assembly static flexure that supports coils of the voice coil motor actuator assembly, according to some embodiments.

FIG. 5 illustrates a voice coil motor actuator assembly static flexure that supports coils of the voice coil motor actuator assembly, according to some embodiments.

In some embodiments, static flexure 322, may be the same static flexure 322 illustrated in FIG. 3 and may couple with a static portion of a lower flexure as illustrated by static portion 310 of lower flexure 312 in FIG. 3. Static flexure 322 includes OIS Y driver 508 and OIS-X driver 510 coupled to static flexure 322. OIS-Y driver 508 may cause current to flow through OIS-Y coil 502 and OIS-Y coil 504, which may cause Lorentz forces to be induced via an interaction with respective dual pole magnets mounted to a carrier frame adjacent to the OIS-Y coils. For example, OIS-Y coil 502 may be located adjacent to dual pole magnet 328 and together with dual pole magnet 328 (shown in FIG. 3), may form a voice coil motor actuator that causes the carrier frame 302 to translate in the OIS-Y direction. In a similar manner, OIS-Y coil 504 may be located adjacent to dual pole magnet 330 and together with dual pole magnet 330 (shown in FIG. 3), may form a voice coil motor actuator that causes the carrier frame 302 to translate in the OIS-Y direction. In some embodiments, VCM actuators formed via OIS-Y coils 502 and 504 (and respective dual pole magnets 328 and 330) may exert balanced forces on a carrier frame 302 to cause the carrier frame to translate in the OIS-Y direction, e.g. the forces may not cause rotation of the carrier frame.

Static flexure 322 also includes OIS-X driver 510 and OIS-X coil 506 mounted to the static flexure 322. OIS-X coil 506 may be positioned adjacent to magnet 332 mounted in carrier frame 302 (shown in FIG. 3) and together with single pole magnet 332 (shown in FIG. 3), may form a voice coil motor actuator that causes the carrier frame 302 to translate in the OIS-X direction. Note that event though there is a single OIS-X coil the Lorentz forces generated by the VCM-X actuator formed between magnet 332 and OIS-X coil 506 may act on the center of mass of the carrier frame and substrate carrier assembly to avoid unbalanced forces that may cause rotation of the carrier frame and substrate carrier assembly about the Z-axis.

In some embodiments, hall sensors are mounted on an underside of static flexure 322 beneath OIS-Y coil 502 and/or OIS-Y coil 504. Also, in some embodiments a hall sensor is mounted on an underside of static flexure 322 beneath OIS-X coil 506.

Figure 6A:
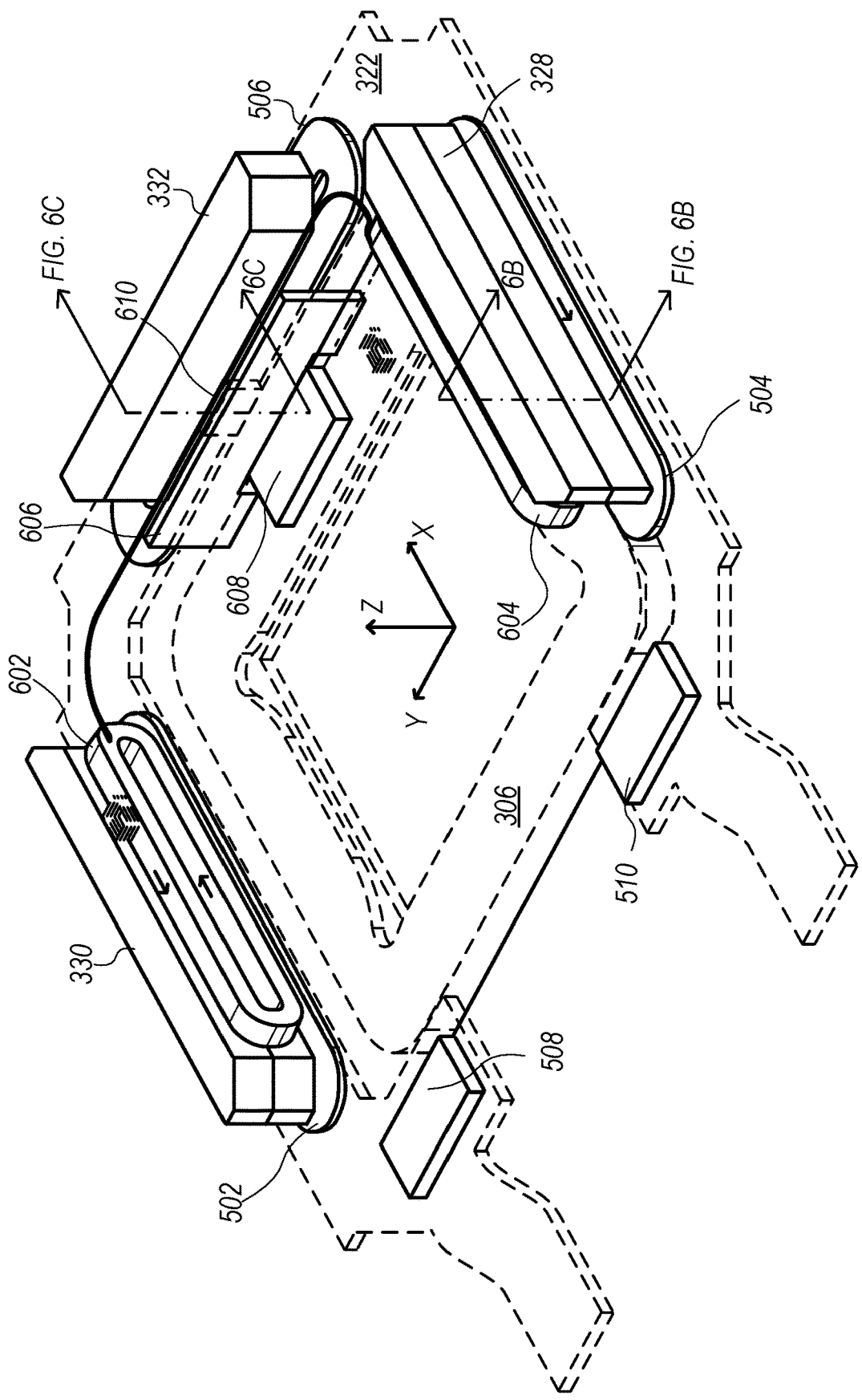
FIG. 6A illustrates positional relationships between coils and magnets in a voice coil motor (VCM) assembly, according to some embodiments.

FIG. 6A illustrates positional relationships between coils and magnets in a voice coil motor (VCM) assembly, according to some embodiments.

FIG. 6A illustrates dual pole magnet 328, dual pole magnet 330, and single pole magnet 332. Note that dual pole magnet 328, dual pole magnet 330, and single pole magnet 332 are actually mounted in carrier frame 302, but carrier frame 302 is not shown in FIG. 6A for ease of illustration. Also, AF-Z coils are shown in FIG. 6A adjacent to dual pole magnets 328 and 330. For example, AF-Z coil 602 is mounted adjacent to dual pole magnet 330 on a different side of dual pole magnet 330 that a side on which OIS-Y coil 502 is mounted. In some embodiments, OIS-Y coil 502 and AF-Z coil 602 are mounted adjacent to perpendicular sides of dual pole magnet 502. Also, in some embodiments, OIS-Y coil 502 and AF-Z coil 602 are oriented perpendicular to one another. Dual pole magnet 328, OIS-Y coil 504, and AF-Z coil 604 are similarly oriented on an opposite side of carrier frame 302.

In some embodiments, AF-Z coils 602 and 604 are mounted to a substrate carrier, such as substrate carrier 304, and together with dual pole magnets 328 and 330 form VCM actuators that generate Lorentz forces that cause a substrate carrier, such as substrate carrier 304, to translate in a vertical direction relative to a carrier frame, such as carrier frame 302, wherein the substrate carrier translates within the carrier frame in which the substrate carrier is mounted. In this way the resulting AF-Z VCM actuators may cause a vertical position of an image sensor, such as image sensor 308, to be adjusted by adjusting the relative position of the substrate carrier relative to the carrier frame. Note that for ease of illustration, the substrate carrier is not shown, but the substrate 306 is shown below and at least some components mounted to the substrate are shown, such as the AF-Z coils 602 and 604.

Also, AF-Z driver 608 is mounted on substrate 306 and drives AF-Z coils 602 and 604. Additionally, AF-Z hall sensor 610 is shown mounted vertically on vertical flex 606 on a backside of the vertical flex between the vertical flex and single pole magnet 332. Because the AF-Z sensor 610 is mounted on vertical flex 606 which is ultimately coupled to substrate carrier 304 and moves with substrate carrier 304 inside of carrier frame 302, any X or Y motion of single pole magnet 332 and/or AF-Z sensor 610 are the same because in the X-direction and in the Y-direction, both the substrate carrier (to which AF-Z sensor 610 is mounted) and the carrier frame (to which single pole magnet 332 is mounted) move together as a unit, such that there is minimal or no relative X or Y motion between the AF-Z sensor 610 and single pole magnet 332. Thus, there is little to no cross coupling of displacement measurements in the X, Y, or Z directions.

Figure 6B:
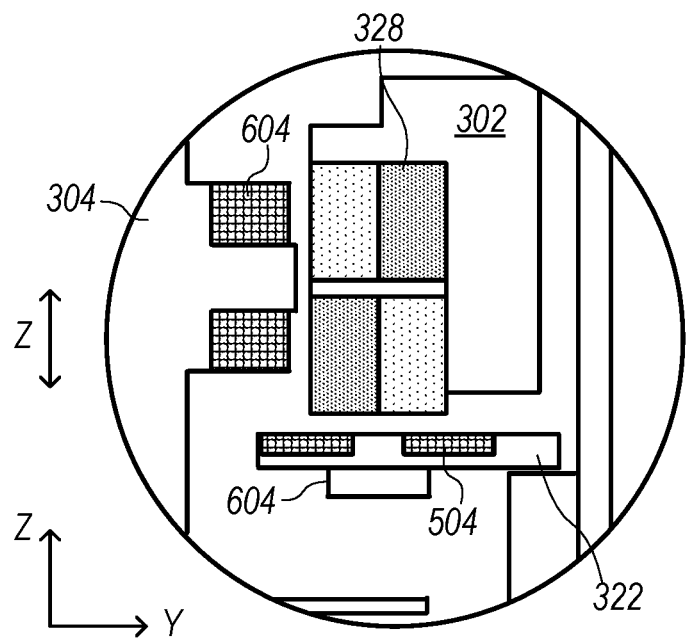
FIG. 6B is a zoomed-in view of a cross-section illustrating an optical image stabilization (OIS) actuator in the OIS-Y direction, an autofocus (AF) actuator in the AF-Z direction, and a position sensor in the OIS-Y direction, according to some embodiments.

FIG. 6B is a zoomed-in view of a cross-section illustrating an optical image stabilization (OIS) actuator in the OIS-Y direction, an autofocus (AF) actuator in the AF-Z direction, and a position sensor in the OIS-Y direction, according to some embodiments.

As shown in FIG. 6B, OIS-Y coil 504 is mounted in/on static flex 322, which is statically mounted in a voice coil motor actuator assembly, such as voice coil motor actuator assembly 300. For example static flex 322 may be supported by a canister, casing, or other static components of a voice coil motor actuator assembly. Also, OIS-Y hall sensor 604 is mounted on an underside of static flex 322 and measures a magnetic field of dual pole magnet 328, which may be used to determine a displacement of the carrier frame in the Y-direction. Note that dual pole magnet 328 is mounted in carrier frame 302 and moves with carrier frame 302. Also, FIG. 6B shows AF-Z coil 604 mounted on a side of substrate carrier 304, wherein AF-Z coil 604 interacts with dual pole magnet 328 to generate Lorentz forces that cause the substrate carrier 304 to move vertically relative to the carrier frame 302 in the Z-direction.

Figure 6C:
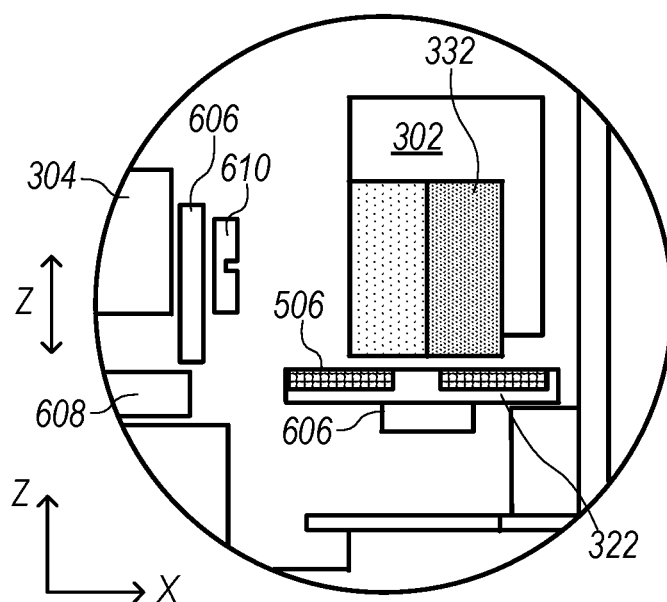
FIG. 6C is a zoomed-in view of a cross section illustrating an optical image stabilization (OIS) actuator in the OIS-X direction, a position sensor in the OIS-X direction, and a position sensor in the autofocus (AF)-Z direction, according to some embodiments.

FIG. 6C is a zoomed-in view of a cross section illustrating an optical image stabilization (OIS) actuator in the OIS-X direction, a position sensor in the OIS-X direction, and a position sensor in the autofocus (AF)-Z direction, according to some embodiments.

As shown in FIG. 6C, OIS-X coil 506 is mounted on static flex 322 and OIS-X hall sensor 606 is mounted on an underside of static flex 322, wherein OIS-X hall sensor 606 measures a magnetic field of single pole magnet 302, which may be used to determine a displacement of the carrier frame in the X-direction. Also, note that single-pole magnet 332 is mounted in/on carrier frame 302 and moves with carrier frame 302. Single pole magnet 332 may be located on an opposite end of a carrier frame from an open end of the carrier frame, and may be adjacent to a back end of a substrate carrier that includes a vertical flexure mounted on the substrate carrier, wherein an AF-Z hall sensor is vertically mounted on the vertical flex coupled to the substrate carrier. For example, vertical flex 606 is coupled to substrate carrier 304 and AF-Z hall sensor 610 is coupled to vertical flex 606 and measures a magnetic field of single pole magnet 332 to determine a vertical displacement of the substrate carrier 304 relative to carrier frame 302 in which the single pole magnet 332 is mounted. Also, shown in FIG. 6B is AF-Z driver 608 mounted beneath a cut out portion of vertical flex 606.

Figure 7:
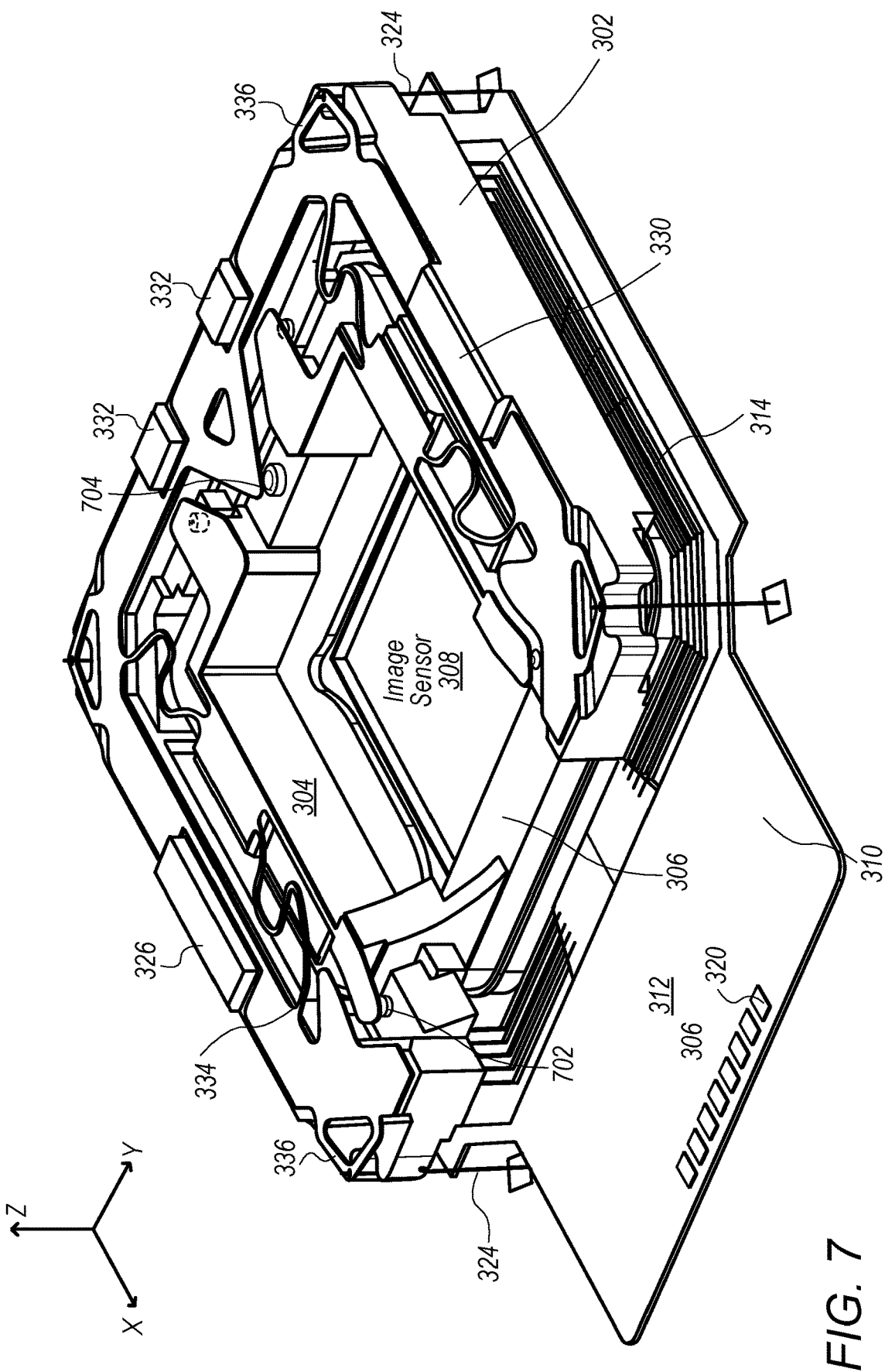
FIG. 7 illustrates a perspective view of a voice coil motor assembly (VCM) configured to translate an image sensor in an autofocus direction and multiple optical image stabilization directions, according to some embodiments.

FIG. 7 illustrates a perspective view of a voice coil motor assembly (VCM) configured to translate an image sensor in an autofocus direction and multiple optical image stabilization directions, according to some embodiments.

FIG. 7 illustrates a more detailed view of an assembled voice coil motor actuator assembly, according to some embodiments. Note that acoustic bumper tabs, such as acoustic bumper tabs 416, 418, 420, 422, 426, 428, and 430 shown in FIG. 4 are also shown in spring plate 334 illustrated in FIG. 7. The acoustic bumper tabs interact with corresponding stop buttons/knobs 702 and 704 to limit motion of the substrate carrier 304 in an upward vertical direction and to limit motion of the substrate carrier 304 in a downward vertical direction beyond respective upward and downward travel ends of a travel distance of the substrate carrier in the carrier frame 302. Note that similar components as illustrated in FIGS. 3-6 are shown in FIG. 7. In some embodiments, the components shown in FIGS. 1-6 may be arranged in a similar manner as shown in FIG. 7, or in other embodiments may vary.

Figure 8:
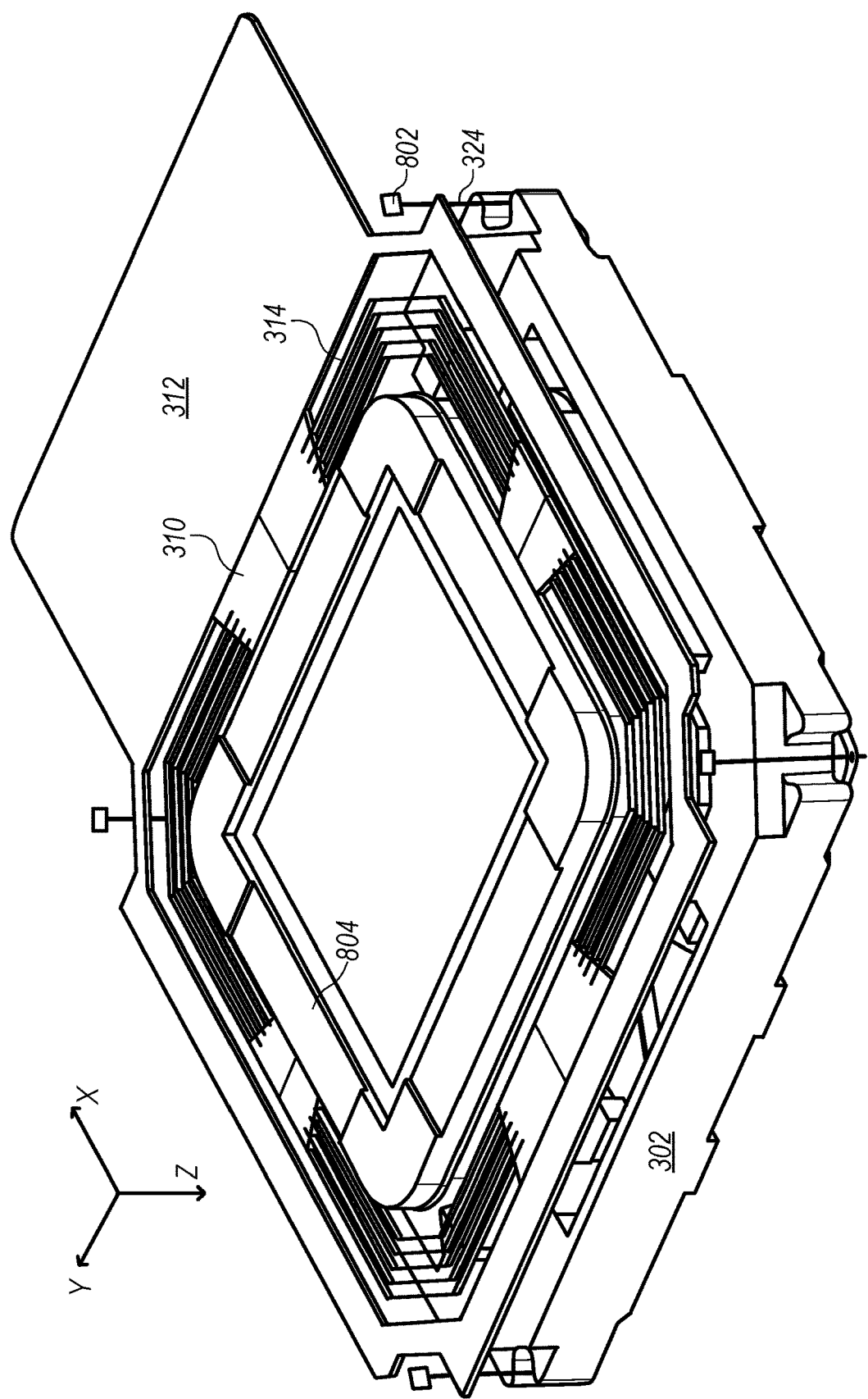
FIG. 8 illustrates a perspective view, from a bottom-side, of a voice coil motor assembly (VCM) configured to translate an image sensor in an autofocus direction and multiple optical image stabilization directions, according to some embodiments.

FIG. 8 illustrates a perspective view, from a bottom-side, of a voice coil motor assembly (VCM) configured to translate an image sensor in an autofocus direction and multiple optical image stabilization directions, according to some embodiments.

In some embodiments, a lower flexure 312 may include flexure arms 314 as illustrated in FIG. 8 that connect to a moveable portion 804 of the lower flexure. In some embodiments, an image sensor, such as image sensor 308, may mount on a substrate connected to the moveable portion 804 of the lower flexure 312. A static portion 310 of the lower flexure 312 may remain statically coupled to a casing or a VCM actuator assembly, but flex arms 314 of the lower flexure 312 may permit the moveable portion 804 to move in the X, Y, and Z directions relative to the static portion 310. Also, the flex arms 314 may provide a communication path between the movable portion 804 and the static portion 310, such that communications may be passed between the moveable portion 804 and the static portion 310 while the moveable portion 804 moves in X, Y, and/or X directions.

In some embodiments, suspension elements 324 may mount to a static base of a VCM actuator assembly via pads 802, as shown in FIG. 8. Note that similar components as illustrated in FIGS. 3-7 are shown in FIG. 8. In some embodiments, the components shown in FIGS. 1-7 may be arranged in a similar manner as shown in FIG. 8, or in other embodiments may vary.

Figure 9:
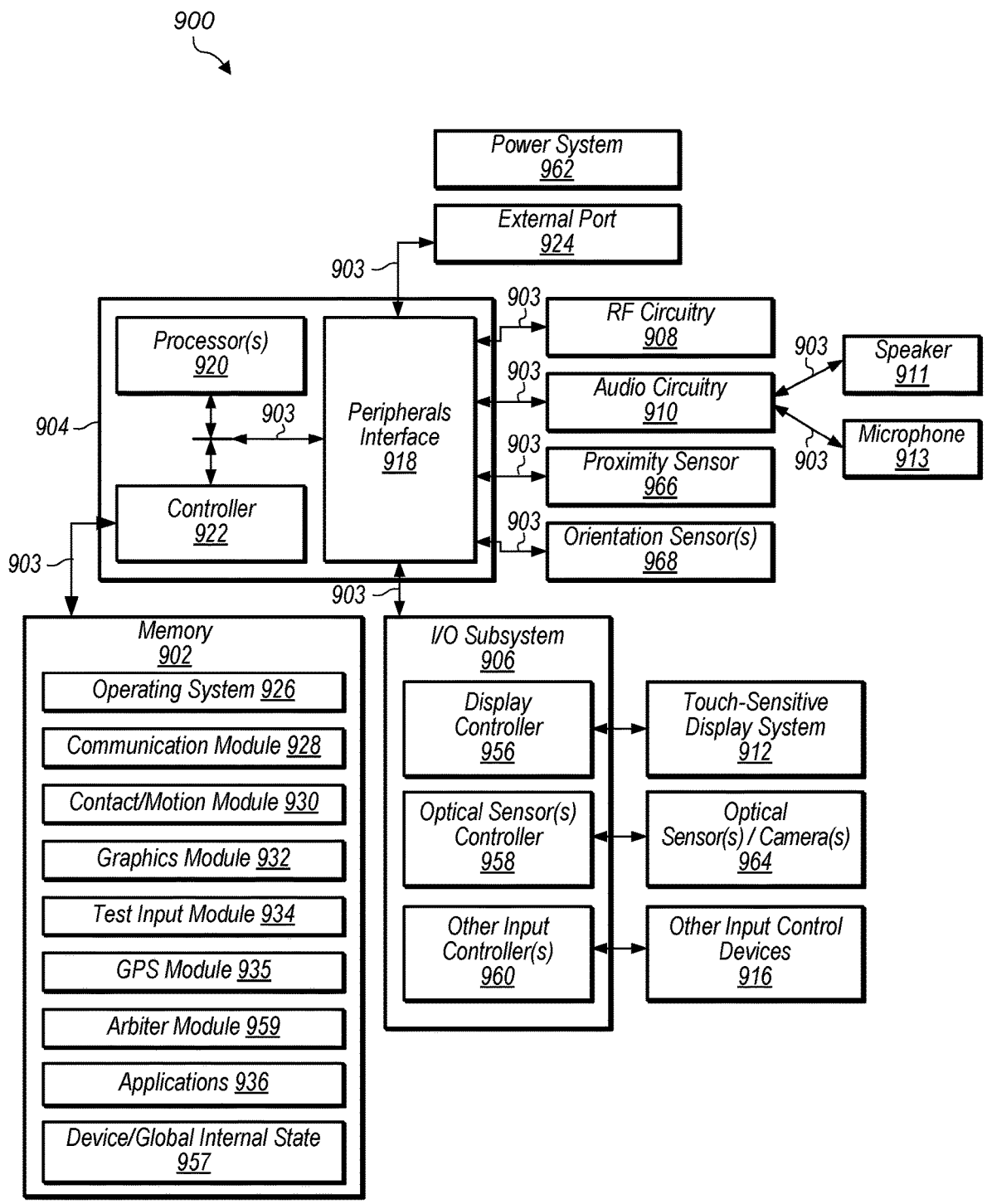
FIG. 9 illustrates a block diagram of an example portable multifunction device that may include a folded optics arrangement camera and voice coil motor actuator assembly configured to move an image sensor in three-dimensions, according to some embodiments.

FIG. 9 illustrates a block diagram of an example portable multifunction device 900 that may include a folded optics arrangement camera and voice coil motor actuator assembly configured to move an image sensor in three-dimensions as described above, in accordance with some embodiments. In some embodiments, the portable multifunction device 900 may include one or multiple features, components, and/or functionality of embodiments described herein with reference to FIGS. 1-8, 10, and 11.

Camera(s) 964 is sometimes called an "optical sensor" for convenience, and may also be known as or called an optical sensor system. In some embodiments, camera 964 may be a folded optics arrangement camera and actuator system as described herein, such as folded optics arrangement camera 100. Device 900 may include memory 902 (which may include one or more computer readable storage mediums), memory controller 922, one or more processing units (CPUs) 920, peripherals interface 918, RF circuitry 908, audio circuitry 910, speaker 911, touch-sensitive display system 912, microphone 913, input/output (I/O) subsystem 906, other input or control devices 916, and external port 924. Device 900 may include one or more optical sensors 964. These components may communicate over one or more communication buses or signal lines 903.

It should be appreciated that device 900 is only one example of a portable multifunction device, and that device 900 may have more or fewer components than shown, may combine two or more components, or may have a different configuration or arrangement of the components. The various components shown in FIG. 9 may be implemented in hardware, software, or a combination of hardware and software, including one or more signal processing and/or application specific integrated circuits.

Memory 902 may include high-speed random access memory and may also include non-volatile memory, such as one or more magnetic disk storage devices, flash memory devices, or other non-volatile solid-state memory devices. Access to memory 902 by other components of device 900, such as CPU 920 and the peripherals interface 918, may be controlled by memory controller 922.

Peripherals interface 918 can be used to couple input and output peripherals of the device to CPU 920 and memory 902. The one or more processors 920 run or execute various software programs and/or sets of instructions stored in memory 902 to perform various functions for device 900 and to process data.

In some embodiments, peripherals interface 918, CPU 920, and memory controller 922 may be implemented on a single chip, such as chip 904. In some other embodiments, they may be implemented on separate chips.

RF (radio frequency) circuitry 908 receives and sends RF signals, also called electromagnetic signals. RF circuitry 908 converts electrical signals to/from electromagnetic signals and communicates with communications networks and other communications devices via the electromagnetic signals. RF circuitry 908 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 908 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 910, speaker 911, and microphone 913 provide an audio interface between a user and device 900. Audio circuitry 910 receives audio data from peripherals interface 918, converts the audio data to an electrical signal, and transmits the electrical signal to speaker 911. Speaker 911 converts the electrical signal to human-audible sound waves. Audio circuitry 910 also receives electrical signals converted by microphone 913 from sound waves. Audio circuitry 910 converts the electrical signal to audio data and transmits the audio data to peripherals interface 918 for processing. Audio data may be retrieved from and/or transmitted to memory 902 and/or RF circuitry 908 by peripherals interface 918. In some embodiments, audio circuitry 910 also includes a headset jack (e.g., 1012, FIG. 10). The headset jack provides an interface between audio circuitry 910 and removable audio input/output peripherals, such as output-only headphones or a headset with both output (e.g., a headphone for one or both ears) and input (e.g., a microphone).

I/O subsystem 906 couples input/output peripherals on device 900, such as touch screen 912 and other input control devices 916, to peripherals interface 918. I/O subsystem 906 may include display controller 956 and one or more input controllers 960 for other input or control devices. The one or more input controllers 960 receive/send electrical signals from/to other input or control devices 916. The other input control devices 916 may include physical buttons (e.g., push buttons, rocker buttons, etc.), dials, slider switches, joysticks, click wheels, and so forth. In some alternate embodiments, input controller(s) 960 may be coupled to any (or none) of the following: a keyboard, infrared port, USB port, and a pointer device such as a mouse. The one or more buttons (e.g., 1008, FIG. 10) may include an up/down button for volume control of speaker 911 and/or microphone 913. The one or more buttons may include a push button (e.g., 1006, FIG. 10).

Touch-sensitive display 912 provides an input interface and an output interface between the device and a user. Display controller 956 receives and/or sends electrical signals from/to touch screen 912. Touch screen 912 displays visual output to the user. The visual output may include graphics, text, icons, video, and any combination thereof (collectively termed "graphics"). In some embodiments, some or all of the visual output may correspond to user-interface objects.

Touch screen 912 has a touch-sensitive surface, sensor or set of sensors that accepts input from the user based on haptic and/or tactile contact. Touch screen 912 and display controller 956 (along with any associated modules and/or sets of instructions in memory 902) detect contact (and any movement or breaking of the contact) on touch screen 912 and converts the detected contact into interaction with user-interface objects (e.g., one or more soft keys, icons, web pages or images) that are displayed on touch screen 912. In an example embodiment, a point of contact between touch screen 912 and the user corresponds to a finger of the user.

Touch screen 912 may use LCD (liquid crystal display) technology, LPD (light emitting polymer display) technology, or LED (light emitting diode) technology, although other display technologies may be used in other embodiments. Touch screen 912 and display controller 956 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 912. In an example embodiment, projected mutual capacitance sensing technology is used.

Touch screen 912 may have a video resolution in excess of 800 dpi. In some embodiments, the touch screen has a video resolution of approximately 860 dpi. The user may make contact with touch screen 912 using any suitable object or appendage, such as a stylus, a finger, and so forth.

In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 900 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 912 or an extension of the touch-sensitive surface formed by the touch screen.

Device 900 also includes power system 962 for powering the various components. Power system 962 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 900 may also include one or more optical sensors or cameras 964. FIG. 9 shows an optical sensor 964 coupled to optical sensor controller 958 in I/O subsystem 906. Optical sensor 964 may include charge-coupled device (CCD) or complementary metal-oxide semiconductor (CMOS) phototransistors. Optical sensor 964 receives light from the environment, projected through one or more lens, and converts the light to data representing an image. In conjunction with imaging module 943 (also called a camera module), optical sensor 964 may capture still images or video. In some embodiments, an optical sensor 964 is located on the back of device 900, opposite touch screen display 912 on the front of the device, so that the touch screen display 912 may be used as a viewfinder for still and/or video image acquisition. In some embodiments, another optical sensor is located on the front of the device so that the user's image may be obtained for videoconferencing while the user views the other video conference participants on the touch screen display.

Device 900 may also include one or more proximity sensors 966. FIG. 9 shows proximity sensor 966 coupled to peripherals interface 918. Alternately, proximity sensor 966 may be coupled to input controller 960 in I/O subsystem 906. In some embodiments, the proximity sensor 966 turns off and disables touch screen 912 when the multifunction device 900 is placed near the user's ear (e.g., when the user is making a phone call).

Device 900 includes one or more orientation sensors 968. In some embodiments, the one or more orientation sensors 968 include one or more accelerometers (e.g., one or more linear accelerometers and/or one or more rotational accelerometers). In some embodiments, the one or more orientation sensors 968 include one or more gyroscopes. In some embodiments, the one or more orientation sensors 968 include one or more magnetometers. In some embodiments, the one or more orientation sensors 968 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 900. In some embodiments, the one or more orientation sensors 968 include any combination of orientation/rotation sensors. FIG. 9 shows the one or more orientation sensors 968 coupled to peripherals interface 918. Alternately, the one or more orientation sensors 968 may be coupled to an input controller 960 in I/O subsystem 906. In some embodiments, information is displayed on the touch screen display 912 in a portrait view or a landscape view based on an analysis of data received from the one or more orientation sensors 968.

In some embodiments, the software components stored in memory 902 include operating system 926, communication module (or set of instructions) 928, contact/motion module (or set of instructions) 930, graphics module (or set of instructions) 932, text input module (or set of instructions) 934, Global Positioning System (GPS) module (or set of instructions) 935, arbiter module 959 and applications (or sets of instructions) 936. Furthermore, in some embodiments memory 902 stores device/global internal state 957. Device/global internal state 957 includes one or more of: active application state, indicating which applications, if any, are currently active; display state, indicating what applications, views or other information occupy various regions of touch screen display 912; sensor state, including information obtained from the device's various sensors and input control devices 916; and location information concerning the device's location and/or attitude.

Operating system 926 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 928 facilitates communication with other devices over one or more external ports 924 and also includes various software components for handling data received by RF circuitry 908 and/or external port 924. External port 924 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 930 may detect contact with touch screen 912 (in conjunction with display controller 956) and other touch sensitive devices (e.g., a touchpad or physical click wheel). In some embodiments, contact/motion module 930 and display controller 956 detect contact on a touchpad. Contact/motion module 930 may detect a gesture input by a user. Different gestures on the touch-sensitive surface have different contact patterns. Graphics module 932 includes various known software components for rendering and displaying graphics on touch screen 912 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. Text input module 934, which may be a component of graphics module 932, provides soft keyboards for entering text in various applications (e.g., contacts, e-mail, and any other application that needs text input). GPS module 935 determines the location of the device and provides this information for use in various applications 936 (e.g., to a camera application as picture/video metadata).

Applications 936 may include one or more modules (e.g., a contacts module, an email client module, a camera module for still and/or video images, etc.) Examples of other applications 936 that may be stored in memory 902 include other word processing applications, other image editing applications, drawing applications, presentation applications, JAVA-enabled applications, encryption, digital rights management, voice recognition, and voice replication. Each of the modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 902 may store a subset of the modules and data structures identified above. Furthermore, memory 902 may store additional modules and data structures not described above.

Figure 10:
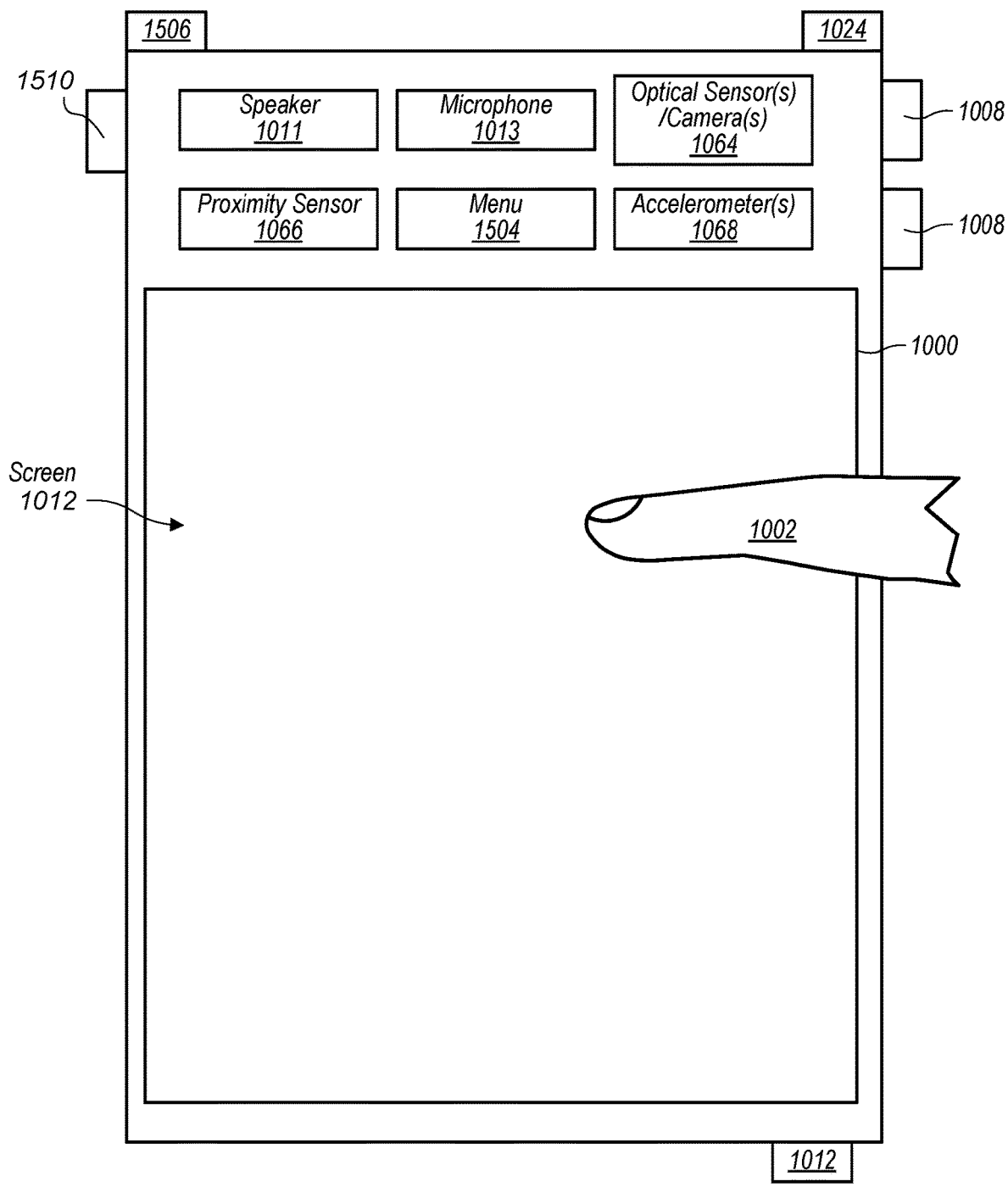
FIG. 10 depicts an example portable multifunction device that may include a folded optics arrangement camera and voice coil motor actuator assembly configured to move an image sensor in three-dimensions, according to some embodiments.

FIG. 10 depicts an example portable multifunction device 900 that may include a camera with a folded optics arrangement, in accordance with some embodiments. In some embodiments, the portable multifunction device 900 may include one or multiple features, components, and/or functionality of embodiments described herein with reference to FIGS. 1-9 and 11.

The device 900 may have a touch screen 912. The touch screen 912 may display one or more graphics within user interface (UI) 1000. In this embodiment, as well as others described below, a user may select one or more of the graphics by making a gesture on the graphics, for example, with one or more fingers 1002 (not drawn to scale in the figure) or one or more styluses 1003 (not shown in FIG. 10).

Device 900 may also include one or more physical buttons, such as "home" or menu button 1004. As described previously, menu button 1004 may be used to navigate to any application 936 in a set of applications that may be executed on device 900. Alternatively, in some embodiments, the menu button 1004 is implemented as a soft key in a GUI displayed on touch screen 912.

In one embodiment, device 900 includes touch screen 912, menu button 1004, push button 1006 for powering the device on/off and locking the device, volume adjustment button(s) 1008, Subscriber Identity Module (SIM) card slot 1010, head set jack 1012, and docking/charging external port 924. Push button 1006 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 900 also may accept verbal input for activation or deactivation of some functions through microphone 913.

It should be noted that, although many of the examples herein are given with reference to optical sensor(s)/camera (s) 964 (on the front of a device), one or more rear-facing cameras or optical sensors that are pointed opposite from the display may be used instead of, or in addition to, an optical sensor(s)/camera(s) 964 on the front of a device.

Figure 11:
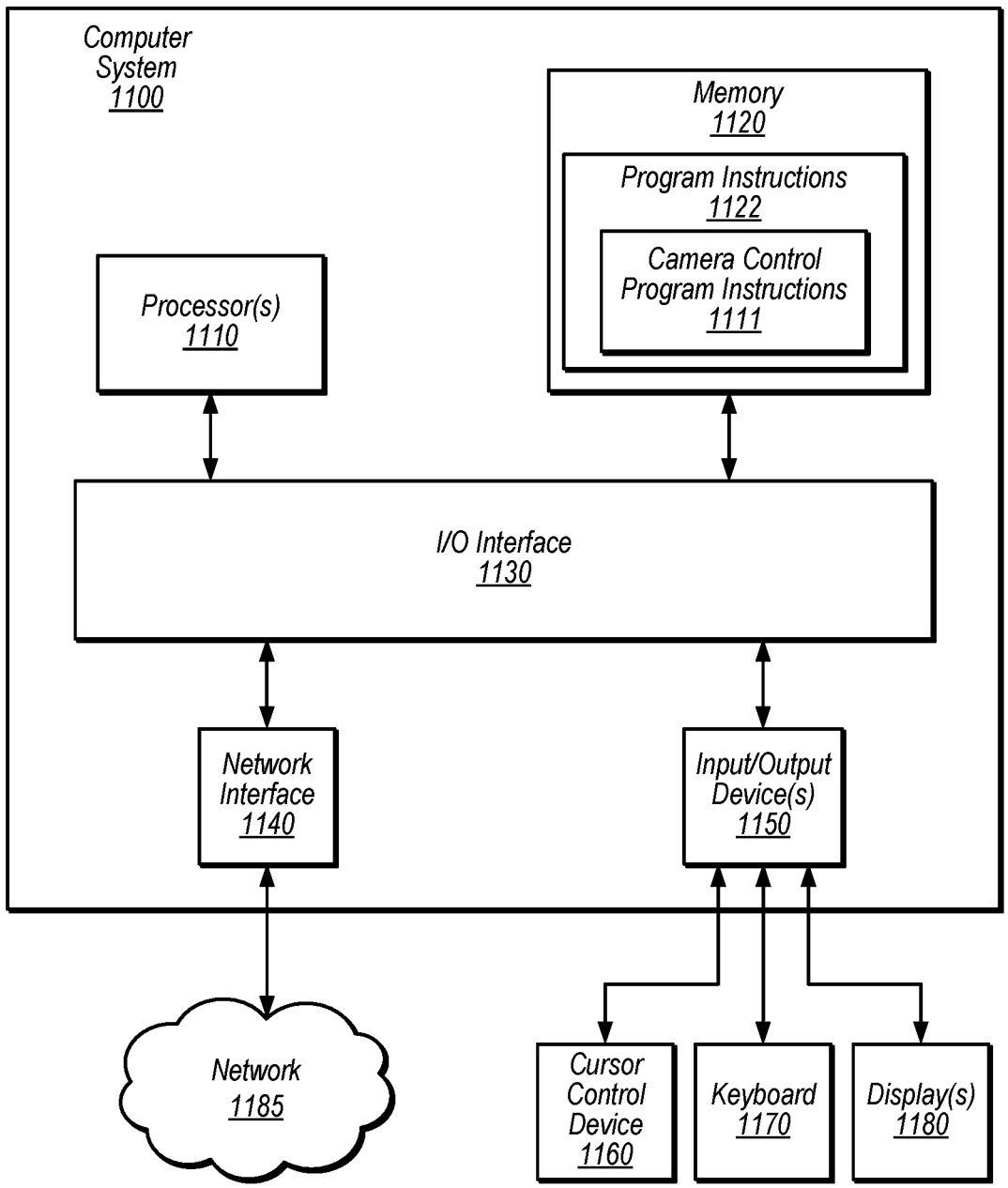
FIG. 11 illustrates an example computer system that may include a folded optics arrangement camera and voice coil motor actuator assembly configured to move an image sensor in three-dimensions, according to some embodiments.

FIG. 11 illustrates an example computer system 1100 that may include a camera with a folded optics arrangement, in accordance with some embodiments. In some embodiments, the computer system 1100 may include one or multiple features, components, and/or functionality of embodiments described herein with reference to FIGS. 1-10.

The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store camera control program instructions 1122 and/or camera control data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement a lens control application 1124 incorporating any of the functionality described above. Additionally, existing camera control data 1132 of memory 1120 may include any of the information or data structures described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
an aperture configured to enable light to enter the camera;
an image sensor configured to capture the light that has entered the camera and convert the light into image signals;
a substrate carrier, configured to support the image sensor;
a carrier frame at least partially surrounding the substrate carrier and configured to support a plurality of magnets; and
an assembly that mechanically couples the substrate carrier to the carrier frame, and permits motion of the substrate carrier relative to the carrier frame in an autofocus (AF) direction, and permits motion of the carrier frame and the substrate carrier in a plurality of optical image stabilization (OIS) directions orthogonal to the autofocus (AF) direction;
the plurality of magnets comprising:
a first magnet coupled to a first side of the carrier frame;
a second magnet coupled to a second side of the carrier frame opposite the first side; and
a third magnet coupled to a third side of the carrier frame orthogonal to the first and second side of the carrier frame;
wherein magnetic fields from the first magnet and second magnet are used in a voice coil motor (VCM) actuator assembly to move the image sensor in the autofocus (AF) direction and move the image sensor in one of the optical image stabilization (OIS) directions orthogonal to the autofocus direction; and
wherein a magnetic field from the third magnet is used in the voice coil motor (VCM) actuator assembly to move the image sensor in a different one of the optical image stabilization directions orthogonal to the autofocus direction.

2. The camera of claim 1, wherein:
the first and second magnets are two dual pole magnets mounted on the opposite sides of the carrier frame; and
the third magnet is a single pole magnet mounted on a side of the carrier frame orthogonal to the sides on which the dual pole magnets are mounted.

3. The camera of claim 1, wherein no magnets are mounted on a fourth side of the carrier frame that remains open, such that a portion of an optical assembly of a folded optics arrangement camera can pass through the open side of the carrier frame.

4. The camera of claim 1, further comprising:
respective coils associated with each of the first, second and third magnets of the VCM actuator assembly;
wherein the first, second and third magnets of the VCM actuator assembly move with the carrier frame and the respective coils associated with the magnets remain stationary.

5. The camera of claim 1, wherein:
the assembly that mechanically couples comprises a static flexure positioned underneath the first, second and third magnets; and
the carrier frame is suspended above the static flexure.

6. The camera of claim 1, wherein:
the first and second magnets are two dual pole magnets mounted on the opposite sides of the carrier frame; and
the camera further comprises:
a first coil coupled to the substrate carrier on a side of the substrate carrier adjacent to the first side of the carrier frame; and
a second coil coupled to the substrate carrier on another side of the substrate carrier that is adjacent to the second side of the carrier frame,
wherein the first coil and the second coil interact with the first dual pole magnet and the second dual pole magnet to cause the substrate carrier to move relative to the carrier frame in the autofocus (AF) direction.

7. The camera of claim 6, further comprising:
a third coil coupled to a static flexure on a portion of the static flexure positioned adjacent to the dual pole magnet; and
a fourth coil coupled to the static flexure on a portion of the static flexure adjacent to the second dual pole magnet,
wherein the third coil and the fourth coil interact with the dual pole magnet and the second dual pole magnet to cause the carrier frame and the substrate carrier to move in a first optical image stabilization (OIS) direction; and
a fifth coil coupled to the static flexure on a portion of the static flexure adjacent to the single pole magnet,
wherein the fifth coil interacts with the single pole magnet to cause the carrier frame and the substrate carrier to move in a second optical image stabilization (OIS) direction orthogonal to the first optical image stabilization (OIS) direction.

8. The camera of claim 1, wherein the camera is a folded optics camera comprising:
a prism configured to redirect the light that enters the camera via the aperture; and
an additional prism configured to redirect the light redirected by the prism such that the light is directed into the autofocus direction, wherein the image sensor is positioned in the camera such that the light directed in the autofocus direction is directed toward the image sensor.

9. A voice coil motor actuator assembly, comprising:
a substrate carrier configured to support an image sensor;
a carrier frame at least partially surrounding the substrate carrier and configured to support a plurality of magnets; and
an assembly that mechanically couples the substrate carrier to the carrier frame and permits motion of the substrate carrier relative to the carrier frame in an autofocus (AF) direction, and permits motion of the carrier frame and the substrate carrier in a plurality of optical image stabilization (OIS) directions orthogonal to the autofocus (AF) direction;
the plurality of magnets comprising:
a first magnet coupled to a first side of the carrier frame;
a second magnet coupled to a second side of the carrier frame opposite the first side; and
a third magnet coupled to a third side of the carrier frame orthogonal to the first and second side of the carrier frame;
wherein magnetic fields from the first magnet and second magnet are used in the voice coil motor (VCM) actuator assembly move the image sensor in the autofocus (AF) direction and move the image sensor in one of the optical image stabilization (OIS) directions orthogonal to the autofocus direction; and
wherein a magnetic field from the third magnet is used in the voice coil motor (VCM) actuator assembly to move the image sensor in a different one of the optical image stabilization (OIS) directions orthogonal to the autofocus direction.

10. The voice coil motor actuator assembly of claim 9, wherein:
the first and second magnets are two dual pole magnets mounted on the opposite sides of the carrier frame; and
the third magnet is a single pole magnet mounted on a side of the carrier frame orthogonal to the sides on which the dual pole magnets are mounted.

11. The voice coil motor actuator assembly of claim 9, wherein no magnets are mounted on a fourth side of the carrier frame that remains open, such that a portion of an optical assembly of a folded optics arrangement camera can pass through the open side of the carrier frame.

12. The voice coil motor actuator assembly of claim 9, further comprising:
respective coils associated with each of the first, second and third magnets of the VCM actuator assembly;
wherein the first, second and third magnets of the VCM actuator assembly move with the carrier frame and the respective coils associated with the magnets remain stationary.

13. The voice coil motor actuator assembly of claim 9, wherein:
the first and second magnets are two dual pole magnets mounted on the opposite sides of the carrier frame; and
the voice coil motor actuator assembly further comprises:
a first coil coupled to the substrate carrier on a side of the substrate carrier adjacent to the first side of the carrier frame; and
a second coil coupled to the substrate carrier on another side of the substrate carrier that is adjacent to the second side of the carrier frame,
wherein the first coil and the second coil interact with the first dual pole magnet and the second dual pole magnet to cause the substrate carrier to move relative to the carrier frame in the autofocus (AF) direction.

14. The voice coil motor assembly of claim 9, further comprising:
a third coil coupled to a static flexure on a portion of the static flexure positioned adjacent to the dual pole magnet and
a fourth coil coupled to the static flexure on a portion of the static flexure adjacent to the second dual pole magnet,
wherein the third coil and the fourth coil interact with the first dual pole magnet and the second dual pole magnet to cause the carrier frame and the substrate carrier to move in a first optical image stabilization (OIS) direction; and
a fifth coil coupled to the static flexure on a portion of the static flexure adjacent to the single pole magnet,
wherein the fifth coil interacts with the single pole magnet to cause the carrier frame and the substrate carrier to move in a second optical image stabilization (OIS) direction orthogonal to the first optical image stabilization (OIS) direction.

15. A mobile multifunction device, comprising:
a camera comprising:
an aperture configured to enable light to enter the camera;
an image sensor configured to capture the light that has entered the camera and convert the light into image signals; and
a voice coil motor actuator assembly comprising:
a substrate carrier configured to support the image sensor;
a carrier frame at least partially surrounding the substrate carrier and configured to support a plurality of magnets; and
an assembly that mechanically couples the substrate carrier to the carrier frame, and permits motion of the substrate carrier relative to the carrier frame in an autofocus (AF) direction, and permits motion of the carrier frame and the substrate carrier in a plurality of optical image stabilization (OIS) directions orthogonal to the autofocus (AF) direction;
the plurality of magnets comprising:
a first magnet coupled to a first side of the carrier frame;
a second magnet coupled to a second side of the carrier frame opposite the first side; and
a third magnet coupled to a third side of the carrier frame orthogonal to the first and second side of the carrier frame;
wherein magnetic fields from the first magnet and second magnet are used in the voice coil motor (VCM) actuator assembly to move the image sensor in the autofocus (AF) direction and move the image sensor in one of the optical image stabilization (OIS) directions orthogonal to the autofocus direction; and
wherein a magnetic field from the third magnet is used in the voice coil motor (VCM) actuator assembly to move the image sensor in a different one of the optical image stabilization (OIS) directions orthogonal to the autofocus direction.

16. The mobile multi-function device of claim 15, wherein the camera is a folded optics camera comprising:
a prism configured to redirect the light that enters the camera via the aperture; and
an additional prism configured to redirect the light redirected by the prism such that the light is directed into the autofocus direction, wherein the image sensor is positioned in the camera such that the light directed in the autofocus direction is directed toward the image sensor.

17. The mobile multi-function device of claim 15, wherein:
the first and second magnets are two dual pole magnets mounted on the opposite sides of the carrier frame; and
the third magnet is a single pole magnet mounted on a side of the carrier frame orthogonal to the sides on which the dual pole magnets are mounted.

18. The mobile multi-function device of claim 15, wherein no magnets are mounted on a fourth side of the carrier frame that remains open, such that a portion of an optical assembly of a folded optics arrangement camera can pass through the open side of the carrier frame.

19. The mobile multi-function device of claim 15, wherein
the first and second magnets are two dual pole magnets mounted on the opposite sides of the carrier frame; and
the voice coil motor actuator assembly further comprises:
a first coil coupled to the substrate carrier on a side of the substrate carrier adjacent to the first side of the carrier frame; and
a second coil coupled to the substrate carrier on another side of the substrate carrier that is adjacent to the second side of the carrier frame,
wherein the first coil and the second coil interact with the dual pole magnet and the second dual pole magnet to cause the substrate carrier to move relative to the carrier frame in the autofocus (AF) direction.

20. The mobile-multi-function device of claim 19, wherein the voice coil motor actuator assembly further comprises:
   a third coil coupled to a static flexure on a portion of the static flexure positioned adjacent to the dual pole magnet and
   a fourth coil coupled to the static flexure on a portion of the static flexure adjacent to the second dual pole magnet,
      wherein the third coil and the fourth coil interact with the dual pole magnet and the second dual pole magnet to cause the carrier frame and the substrate carrier to move in a first optical image stabilization (OIS) direction; and
   a fifth coil coupled to the static flexure on a portion of the static flexure adjacent to the single pole magnet,
      wherein the fifth coil interacts with the single pole magnet to cause the carrier frame and the substrate carrier to move in a second optical image stabilization (OIS) direction orthogonal to the first optical image stabilization (OIS) direction.

* * * * *